Oct. 12, 1971     H. S. SHAPIRO     3,611,593

LINE-GROUP SEQUENTIAL READING AID

Filed Nov. 14, 1969     2 Sheets-Sheet 1

FIG. 1

- Legislation in Spain concerning the Utility Model calls for some
- comment.
- In the first place, the Law does not define with desirable clarity
- how the object of a Utility Model and a Patent differ. In fact, Article
- 171 of the Law states that the Registry of Industrial Property con-
- cedes a Utility Model registration for such instruments, tools, devices
- and objects or parts of the same, as contribute a benefit or new
- effect in their functioning, or a saving of time, energy, labour, or an
  improvement in the general working conditions.
- If one compares this definition with that covering the inventions
  which may be protected under a Patent of Invention, it is not pos-
- sible to establish between them the distinction necessary for the
  classification of the inventions under each class of protection. So
- that in practice, we are obliged to follow an empirical criterion in
  accordance with which the Utility Model is applied for such small
- inventions as tools, utensils, objects of utility, etc., reserving the

FIG. 2

- Patent of Invention to protect more complicated inventions, such as
- machines, industrial processes, complicated installations, etc. The
  lack of a dividing line between the two forms of protection to which
  we refer, has many disadvantages. For example, it is very difficult
- to judge whether such articles as a plow, a washing machine, a
- polishing machine, etc., should be registered as Models or Patents,
  and the proof of this is that in many of these cases and for similar
  objects, sometimes Patents have been granted and at others Models.
- And to this lack of exact definition in differentiating the classifi-
- cation of the Utility Model, are added the difficulties of concession
  procedure, in that the application for the Utility Model is published
  in the Official Bulletin so that opposition may be made by parties
- considering themselves prejudiced by the concession of a Model
- applied for. The Patent Office is therefore obliged to accept opposi-
  tions which are submitted within the stipulated period; to study the
  arguments put forward; to compare different Models with the Models
- applied for, and with Patents granted previously; to judge the merit

FIG. 3

- of the different inventions and in short to carry out a very complicat-
- ed piece of work. Now, this work which is avoided in connection
- with Patents of Invention, appears illogical for the protection of
  Utility Models which cover, in general, objects of lesser technical
  importance.
- Another great difficulty is that created by the fact that in the case
- of Utility Models, only one of their concrete forms or realisation
- has to be described, as, in practice, it is not permitted, since the
- Law mentions nothing regarding this, to state any variations of
  operation, nor even different solutions, within the essential idea
  which constitutes the invention. Neither is any indication permitted

INVENTOR: HARRY S. SHAPIRO

BY: Darby & Darby, attys.

Oct. 12, 1971 H. S. SHAPIRO 3,611,593

LINE-GROUP SEQUENTIAL READING AID

Filed Nov. 14, 1969 2 Sheets-Sheet 2

FIG. 4

Legislation in Spain concerning the Utility Model calls for some comment.

In the first place, the Law does not define with desirable clarity how the object of a Utility Model and a Patent differ. In fact, Article 171 of the Law states that the Registry of Industrial Property concedes a Utility Model registration for such instruments, tools, devices and objects or parts of the same, as contribute a benefit or new effect in their functioning, or a saving of time, energy, labour, or an improvement in the general working conditions.

If one compares this definition with that covering the inventions which may be protected under a Patent of Invention, it is not possible to establish between them the distinction necessary for the classification of the inventions under each class of protection. So that in practice, we are obliged to follow an empirical criterion in accordance with which the Utility Model is applied for such small inventions as tools, utensils, objects of utility, etc., reserving the

FIG. 5

Patent of Invention to protect more complicated inventions, such as machines, industrial processes, complicated installations, etc. The lack of a dividing line between the two forms of protection to which we refer, has many disadvantages. For example, it is very difficult to judge whether such articles as a plow, a washing machine, a polishing machine, etc., should be registered as Models or Patents, and the proof of this is that in many of these cases and for similar objects, sometimes Patents have been granted and at others Models.

And to this lack of exact definition in differentiating the classification of the Utility Model, are added the difficulties of concession procedure, in that the application for the Utility Model is published in the Official Bulletin so that opposition may be made by parties considering themselves prejudiced by the concession of a Model applied for. The Patent Office is therefore obliged to accept oppositions which are submitted within the stipulated period; to study the arguments put forward; to compare different Models with the Models applied for, and with Patents granted previously; to judge the merit

FIG. 6 of the different inventions and in short to carry out a very complicated piece of work. Now, this work which is avoided in connection with Patents of Invention, appears illogical for the protection of Utility Models which cover, in general, objects of lesser technical importance.

Another great difficulty is that created by the fact that in the case of Utility Models, only one of their concrete forms or realisation has to be described, as, in practice, it is not permitted, since the Law mentions nothing regarding this, to state any variations of operation, nor even different solutions, within the essential idea which constitutes the invention. Neither is any indication permitted

INVENTOR: HARRY S. SHAPIRO

BY: *[signature]*, Attys.

.# United States Patent Office 3,611,593
Patented Oct. 12, 1971

3,611,593
LINE-GROUP SEQUENTIAL READING AID
Harry S. Shapiro, 120 Ruth-Ellen Drive,
Richmond Heights, Ohio 44143
Filed Nov. 14, 1969, Ser. No. 876,709
Int. Cl. G09b *17/02*
U.S. Cl. 35—35 B                        2 Claims

ABSTRACT OF THE DISCLOSURE

A system for aiding the eye of the reader in properly following the sequence of lines to be read by providing marginal indicia at the start of each line or line-group to guide the reader's eye to the start of the next succeeding line-group to be read and, preferably, to tie in this starting indicia with like indicia at the end of the preceding line-group.

BACKGROUND OF THE INVENTION

Although the invention relates broadly to an aid to reading, it is particularly directed to guiding the movement of the reader's eye from one line or line-group of printed material or the like to the next succeeding line or line-group, in order to overcome the tendency to skip over a line or line-group. This "skip-over" tendency exists for almost every reader in a varying degree. To the extent that the format of the reading unit, such as a page or column, consists of relatively short lines which are relatively widely spaced from each other, the difficulty is minimized. On the other hand, where the lines are closely spaced to each other, particularly when this is coupled with a long length of reading line, the tendency to skip lines is considerably aggravated.

The natural tendency of the eye is to have a broad field of vision, so that the reader's eye finds it difficult and fatiguing to isolate and sequentially follow the start of the next reading line on the left margin of the page after leaving the end of the preceding reading line on the right hand margin of the page. A definite effort of concentration of physical and mental effort, both subconscious and deliberate, is required in properly manipulating the eyes during the reading process to follow the lines in proper sequence in those instances where the format of the page has less than optimum readability characteristics. Unfortunately, such optimum characteristics of wide line spacing and short lines are usually only found in children's reading material and seldom found in adult reading material.

The adult reader finishes one reading line and then permits his eyes to drop down and shift over to the start of what he hopes to be the next succeeding line. The reader's eyes physically search for the beginning of the next line while the mind attempts to check or validate a continuity of comprehension between the end of the previous reading line and the start of the next line. If the mind cannot establish such continuity of comprehension, then the eye searches the start of the line immediately above or immediately below that which it has been observing in order to try and capture the continuity of expression which the mind is seeking.

For some individuals, this physical and mental searching procedure is almost entirely subconscious and is accomplished rapidly and fairly easily with little conscious effort. At the other extreme, there are individuals whose capacities are such that they have to exert a deliberate and conscious effort of concentration and searching to read lines in the proper sequence. If they do not take the time and patience for this concentration and searching, they tend to skip lines or groups of lines frequently and lose comprehension of the subject matter which is being read. Whether the individual's reading capacity is such that he falls into one of these extremes or the other, or somewhere in between, the reader's mental and physical efforts, whether conscious or subconscious, are accompanied with eye fatigue, nervous tension and impairment of reading speed or reading accuracy to a significant degree.

SUMMARY OF THE INVENTION

By providing marginal indicia to visually separate and distinguish the start of one line or line-group from the next succeedling line or line-group, the reader's eye is greatly aided in establishing a pattern of reading in which the lines are followed and read in proper sequence, without the necessity for constant searching and concentration to avoid the skipping of lines. Preferably, the pattern of reading which the eye learns to follow is based upon a tie-in or coupling of the identification of the end of a reading line with a like identification of the start or beginning of the next succeeding reading line line.

The distinguishing indicia will preferably consist of an arbitrary symbol which will not have any intelligence-transmitting character which could interfere with the comprehension of the text of the reading matter. For that reason, informational symbols, such as numerals or letters or directional symbols, are undesirable for the intended purpose. Abstract geometrical symbols such as circles, triangles, squares which can serve as identifying markings, but which are otherwise non-informational in character in the context used can best serve as the guide indicia, without any interference with the transmission of intelligence from the printed page to the mind of the reader.

Because the area or field of vision differs among various individuals, and the rapidity and scope of comprehension of that which is scanned by the reader also varies greatly among individuals, it has been found that some readers effect the mechanics of reading by reading one word at a time in sequence and build comprehension in a parallel manner. Others encompass phrases or the entire line in their reading and comprehension, and still others encompass two or three lines in their reading and comprehension. The guide marks or aids herein described are adaptable to single line reading or to multiple line groupings and I use the term "line-group" to define either a single reading line or a plurality of reading lines.

In its simplest form, the invention contemplates indicia or markings at the start of each line-group to distinguish that line-group from the next succeeding line-group. The indicia are non-informational and preferably in the form of an arbitrary geometric symbol which serves to mark the start of one line-group, whereas another arbitrary and different symbol or the absence of any symbol serves to distinguish the next succeeding line-group. Preferably there is a coupling or tie-in between the indicia used at the start of a line and a like indicia used at the end of the preceding line-group. This pattern of indicia is repeated throughout the reading unit, which may be a paragraph, a column or a page and quickly serves to guide the eye from the end of one line-group to the start of the next, without requiring that degree or extent of conscious or subconscious concentration and searching for proper line-group sequence as would be required without the use of the guide marks or aids.

Thereby, reading speed and accuracy is increased, and eye fatigue and nervous tension are minimized. Furthermore, the reading unit can have a format of closely spaced lines of long length without involving the reader in the fatigue and strain factors previously mentioned.

BRIEF DESCRIPTION OF THE DRAWING

FIG. 1 represents a portion of a page of a book or the like showing a representative embodiment of one form of the invention.

FIGS. 2, 3, 4, 5 and 6 are similar to FIG. 1 and show modified forms of the invention.

DESCRIPTION OF THE PREFERRED EMBODIMENTS

Referring to FIG. 1 of the drawings, there is shown a portion of a printed page of a book or the like. In the left-hand margin of the page closely adjacent to the start of each alternate line of reading matter there is an indicia symbol or mark 10 in the form of a dot or circle. With this arrangement, the eye of the reader will become accustomed to dropping his eyes alternately from a line carrying the indicia 10 to a line which lacks the indicia 10, but which instead is provided with a blank space to distinguish it from the preceding line of reading matter. Thus, the blank space or lack of a visible symbol serves as a distinguishing characteristic for the alternate lines in contrast to the symbol 10.

The eye of the reader does not have to search to any great extent to follow the sequence of the lines of reading matter with this marking arrangement, but the reader easily adopts the habit of starting a new line which is distinguished from or marked differently from the start of the line that he has just finished reading.

In FIG. 2 of the drawings, the same principle of marking is used for a line-group consisting of two lines of reading matter. This is for those readers, previously mentioned, who tend to read and comprehend in sweeps of two lines at a time. It will be noted that the arbitrary symbol 10 is placed at the start of each of the two lines which form the line-group and that the distinguishing characteristic in the next succeeding line-group is the blank space or lack of the symbol 10 at the start of each of the next succeeding two lines.

The same method and principle described with reference to FIGS. 1 and 2 of the drawings is carried forward in FIG. 3 of the drawings for a line-group consisting of three lines each of which is provided with the guide symbol 10 at the start of the line in the left-hand margin of the page and then, in the next succeeding three lines, which represent the next succeeding line-group, the distinguishing characteristic is the blank space in the left-hand margin at the start of each of the three lines. This is intended for the rather unusual reader who encompasses three lines in his reading sweep and comprehension, rather than going line by line or in sweeps of two lines, as previously described.

In the forms of the invention shown in FIGS. 1–3, there is no identity tie-in or coupling between the end of the line-group and the start of the next line-group. For greater ease in following the line-group sequence in reading, it is desirable that there be such a tie-in. Such an arrangement is shown in FIG. 4 of the drawings, which can be considered as a modification or improvement upon the form of invention shown in FIG. 1.

In the form of FIG. 4, the start of each alternate line of the page is marked by the arbitrary symbol or dot 10 and the in-between lines are distinguished by the absence of any marking in the left-hand margin. In the right-hand margin of the page, those lines which are marked with the symbol 10 in the left-hand margin are free of such marking at the end of the line in the right-hand margin and those lines which are distinguished by the lack of the symbol 10 in the left-hand margin at the start of the line, are provided with the marking symbol 10 at the end of the line in the right-hand margin. It will be noted that as the eye starts with a line having the symbol 10 in the left-hand margin and ends with a blank space at the end of this line, this blank space ties in or leads to the like blank space denoting the start of the next succeeding line of reading matter. This next succeeding line is marked at its end in the right-hand margin with the symbol 10 which leads or ties in to the like symbol 10 indicating the start of the next line to be read. This pattern is repetitively repeated throughout the page. In this manner, the ending indicia, whether it be a mark or a blank space, serves as a bridge or guide to a like indicia denoting the start of the next succeeding line to be read. The eyes quickly become accustomed to ending on mark 10 and starting the next line that carries the symbol 10 at its start and then alternately ending in a blank space and starting the next line which has a blank space in the left-hand margin. Inasmuch as these guide marks or indicia follow the normal and established pattern of reading, the mind quickly adapts itself to the sequence of finding the alternate markings in the established pattern and thus the elements of concentration, search and strain are minimized and the skipping of lines is avoided.

FIG. 5 of the drawings shows the same principle as the just-described FIG. 4, but utilizes a uniform pattern of different contrasting markings on alternate lines in lieu of the blank spaces used for distinguishing the alternate lines in the form of FIG. 4. In this form of the invention, that line which starts with the symbol 10 in the left-hand margin also carries the like symbol 10 at the end of the immediately preceding line. The start of the next succeeding line is designated by the symbol 11 in the left-hand margin, which is the same symbol used at the end of the immediately preceding line in the right-hand margin. In this form of the invention, the visible symbol 11, in the form of a square, serves as the distinguishing indicia on alternate lines in lieu of the blank space or spaces previously referred to in the discussions of FIGS. 1–4 inclusive as providing the distinguishing or contrasting indicia to the visible symbol 10.

The eye of the reader carries easily from the symbol 10 at the end of one line to the like symbol 10 at the start of the next and then to the symbol 11 at the end of that line to the like symbol 11 at the start of the next succeeding line, and so on.

In FIG. 6 of the drawings, another modified form of the invention is shown in which the line-group consists of two lines, as in FIG. 2, and the symbol 10 is used in the left-hand margin to show the start of each line-group, with the absence of the mark denoting the start of the next two lines in the next succeeding line-group. A bridging or tie-in arrangement between the end of one line-group and the start of another is provided by the use of the symbol 10 in the right-hand margin of the page at the end of the line which immediately precedes the start of the line-group marked by the symbol 10 in the left-hand margin. Although this reading aid arrangement or system is not quite as easy for the eyes to follow as is the arrangement shown in FIG. 5 of the drawings, it does represent some improvement over the form of invention shown in FIG. 2 of the drawings, in guiding the movement of the eye in the desired line-group sequence of reading.

By distinguishing the start of alternate line-groups from each other by a uniform pattern of different or contrasting indicia, both the eye and the mind are relieved of the concentrated strain and waste of time involved in searching for the proper line sequence of the normal reading pattern. This system can be further implemented by using a companion or tie-in pattern of indicia in the right-hand margin of the page to provide a continuity or bridging effect between the end of one line and the start of the next line to be read. In addition to using contrasting geometric symbols or a geometric symbol and a blank space as indicia, the use of the same symbol in different colors can also be utilized for distinguishing alternate lines.

Having thus described my invention, I claim:

1. In a reading system for the page of a book or the like, the method of aiding line-group sequential reading consisting of the steps of marking the start of a first line-group with a visible arbitrary indicia marking, distinguishing the start of the next succeeding line-group by not using said same indicia marking, marking the end of said next succeeding line-group with the same marking used for the start of said first line-group, and continuing said pattern for succeeding pairs of line-groups in a unit of reading matter.

2. In a unit of reading matter in a page of a book or the like, an aid to line-group sequential reading comprising first marginal indicia visibly marking the start of a first line-group, said marking consisting of at least one arbitrary symbol, second marginal indicia consisting of at least one arbitrary symbol different than said first-named symbol distinguishing the start of the next succeeding line-group, third marginal indicia of the same form as said second marginal indicia marking the end of said first line-group, fourth marginal indicia of the same form as said first marginal indicia marking the end of said next succeeding line-group, said third and fourth marginal indicia being disposed in a margin of said unit of reading matter opposite the margin containing said first and second marginal indicia, and said pattern of said starting and ending marginal indicia being uniformly repeated in said unit of reading matter.

References Cited

UNITED STATES PATENTS 875,756   1/1908   Warren _____ 283—45 X

WILLIAM H. GRIEB, Primary Examiner

U.S. Cl. X.R.

283—46